Figure 1:
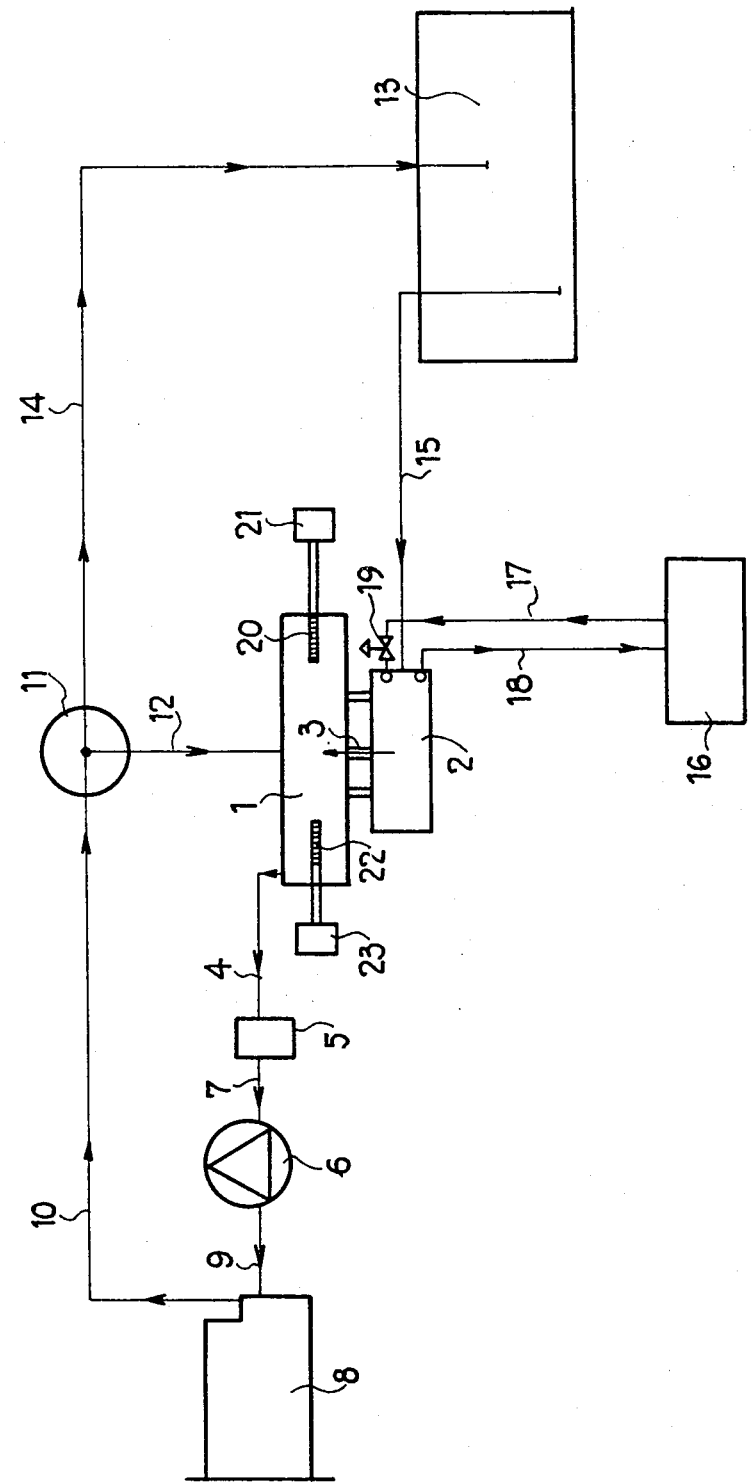

United States Patent [19]

Rédélé

[11] 4,432,329
[45] Feb. 21, 1984

[54] APPARATUS FOR HEATING FUEL INJECTED INTO A DIESEL ENGINE

[75] Inventor: Jean E. A. Rédélé, Paris, France

[73] Assignee: Scoma Energie, Paris, France

[21] Appl. No.: 394,150

[22] Filed: Jul. 1, 1982

[30] Foreign Application Priority Data

Jul. 8, 1981 [FR] France ................. 81 13417

[51] Int. Cl.$^3$ ........................................... F02M 31/00
[52] U.S. Cl. ..................................... 123/557; 123/514; 123/516
[58] Field of Search .............. 123/557, 552, 514, 516

[56] References Cited

U.S. PATENT DOCUMENTS 2,599,699 6/1952 Dilworth ............................ 123/516
4,343,283 8/1982 Shepherd .......................... 123/514

FOREIGN PATENT DOCUMENTS 2324888 4/1977 France ................................. 123/516

Primary Examiner—Ronald H. Lazarus
Attorney, Agent, or Firm—Burns, Doane, Swecker & Mathis

[57] ABSTRACT

The object is to provide an apparatus for easily starting up the engine under cold conditions and avoid any crystallization of the Diesel oil under these conditions. The apparatus comprises a heat exchanger (2) heating the fuel by means of a heat-carrying fluid, such as the cooling liquid of the engine, when it has reached a predetermined minimum value. A reserve supply of hot fuel (1) is connected to the exchanger (2) and comprises at least one auxiliary source of heat (20). The reserve supply of hot fuel is connected to an injection pump (8) and also to a thermostat valve (11) inserted in a return pipe (10) of the injection pump (8). This valve (11) connects the return valve (10) directly to the reserve supply of hot fuel (1) below a previously fixed temperature of the latter or when the temperature of the fuel is higher than the previously fixed temperature, it connects the return pipe (10) to the main fuel tank (13) which is itself connected to the heat exchanger.

8 Claims, 2 Drawing Figures

APPARATUS FOR HEATING FUEL INJECTED INTO A DIESEL ENGINE

DESCRIPTION

The present invention relates to an apparatus for heating fuel, and in particular Diesel oil, injected into a Diesel engine.

The Diesel oil employed as fuel in Diesel engines has a tendency to become crystallised in cold weather and consequently to clog the pipes and filters which may prevent the starting up and even, when operating at low or very low temperature, prevent the operation of the engine.

An object of the invention is to overcome this drawback and to provide an apparatus which permits an easy starting up of the engine and avoids any crystallisation of the Diesel oil when it is used in cold weather and which, moreover, results in a reduction in the white smoke emitted under cold conditions when starting up and in the smokes emitted when accelerating, which contain in particular nitrogen oxides and unburnt hydrocarbons. The apparatus according to the invention also reduces the consumption of Diesel oil.

According to the invention, there is provided an apparatus for heating fuel injected into a Diesel engine, said apparatus comprising a heat exchanger which heats the fuel by means of a heat-carrying fluid, a reserve supply of hot fuel connected to the heat exchanger and comprising at least one auxiliary source of heat, the reserve supply of hot fuel being also connected to an injection pump and also to a thermostat valve inserted in a return pipe of the injection pump, said thermostat valve connecting the return pipe directly to the reserve supply of hot fuel below a previously fixed temperature of the fuel, or, when the temperature of the fuel is higher than the previously fixed temperature, connecting the return pipe to the main fuel tank which is itself connected to the heat exchanger.

According to other features of invention:
- the heat-carrying fluid is formed by the hot exhaust gases of the engine;
- the heat-carrying fluid is formed by the cooling liquid of the engine when it has reached a predetermined minimum temperature adjusted between about 35 and 60° C.;
- the heat-carrying fluid is constituted by the lubricating oil of the engine when it has reached an adjusted predetermined minimum temperature adjusted as for the cooling liquid; it is also possible to employ a suitable combination of heat-carrying fluids, depending on the calorific power required for the heating;
- the thermostat valve is in particular a wax thermostat which controls the by-passing of the Diesel oil to the main tank beyond a suitable temperature, for example about 30° to 60° C. and in particular about 50°;
- the cooling liquid of the engine is admitted into the heat exchanger by means of a pipe provided with a thermostat valve, when its temperature has reached a suitable level, for example 35° to 60° C. and in particular about 50° C.;
- the source of auxiliary heat placed in the reserve supply of hot fuel is an electric resistor supplied with current by the battery of the engine;
- the reserve supply of hot fuel may further comprise a second auxiliary source of heat constituted by an electric resistor supplied with current by a source of electricity ouside the engine.

The electric supply for these resistors may be controlled manually, by a timing device, or automatically.

The reserve supply of hot fuel may be constituted by the internal volume containing the Diesel oil of the exchange region of the heat exchanger.

Figure 2:
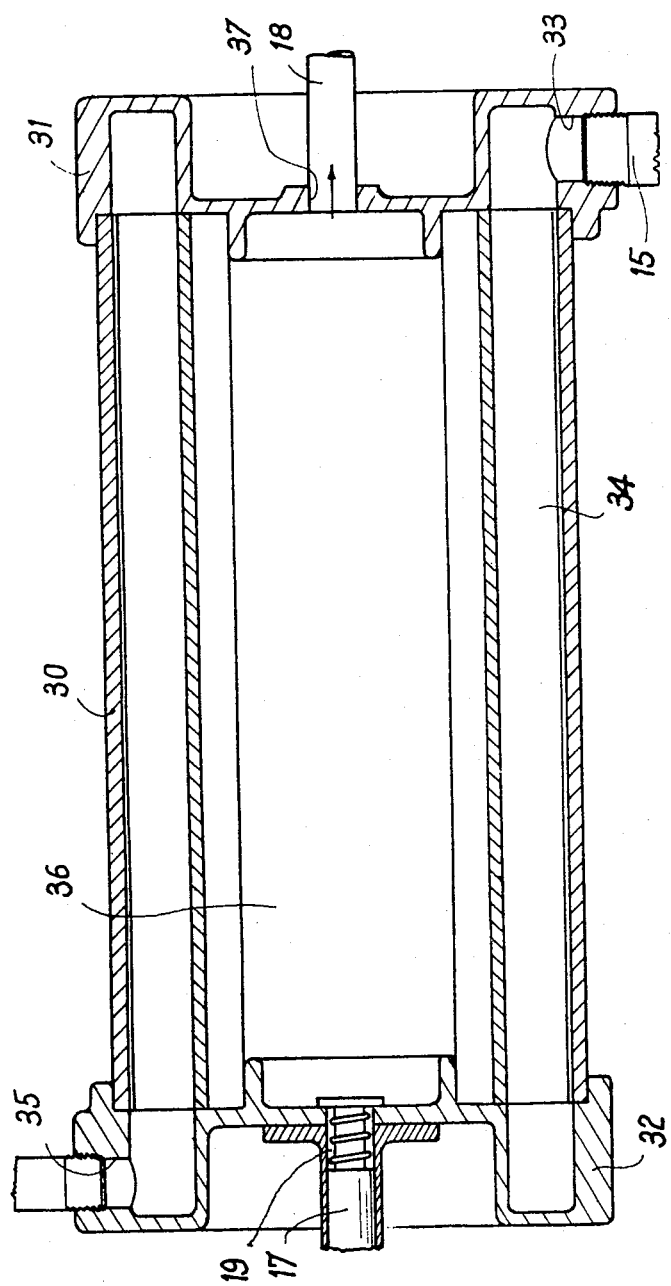

The invention will be described hereinafter with reference to the accompanying drawings in which:

FIG. 1 is a diagrammatic view of the principle of operation of the apparatus, and FIG. 2 is an axial sectional view of a heat exchanger employed in the apparatus shown in FIG. 1.

In FIG. 1 illustrating the principle of operation of the Diesel oil heating apparatus, a reserve supply of hot Diesel oil 1, which may be heat insulated, is connected to a heat exchanger 2 through a pipe 3. The reserve supply of hot Diesel oil 1 is connected through a pipe 4 to a Diesel oil filter 5 which is connected to a supply pump 6 through a pipe 7. The supply pump 6 supplies the Diesel oil to an injection pump 8 through a pipe 9. The injection pump 8 is connected, through a return pipe 10, to a thermostat valve 11 having three ways which communicates, on one hand, with the reserve supply 1 through a pipe 12 and, on the other hand, with a maim Diesel oil tank 13 through a pipe 14.

Leading from the main tank 13 is a Diesel oil supply pipe 15 which is connected to the heat exchanger 2 where the Diesel oil is heated by means of a heat-carrying fluid.

This heat-carrying fluid is constituted by the liquid of the cooling circuit 16 of the engine which is conducted to the exchanger through a by-pass circuit 17, 18 which is controlled by a thermostat valve 19.

Thus, when starting up, the cooling liquid is cold and the thermostat valve 19 inserted in the supply pipe 17 remains closed.

The reserve supply of hot Diesel oil comprises a first auxiliary source of heat which is an electric resistor 20 supplied with current through the electric circuit of the engine by a battery 21.

A second source of heat 22, constituted by another electric resistor, is provided and is supplied with current by an electric apparatus 23 outside the engine, for example the general mains supply when the vehicle comprising the engine is stationary.

The Diesel oil is thus maintained hot in its heat-insulated reserve supply by the effect of the first auxiliary source of heat connected to the battery 21 of the engine or, optionally, by the effect of the second auxiliary source of heat 22.

When starting up the engine, the valve 19 is closed, since it is so set that opening occurs when the temperature of the cooling liquid of the engine reaches a sufficient value, for example about 50° C., so as to avoid cooling the hot Diesel oil circulating in the heat exchanger.

The thermostat valve 11 then directs the Diesel oil circulating in the return pipe 11 to the reserve supply 1. Indeed, there is also adjusted for this thermostat valve the direction-changing temperature at 50°, beyond which temperature the Diesel oil is directly recycled to the tank 13 through the pipe 14.

After a certain period of operation of the engine, the temperature of the latter rises and results in an increase in the temperature of the cooling liquid which then rises beyond the threshold of 50° and causes the opening of the thermostat valve 19.

The cooling liquid of the engine then gives up its heat in the exchanger 2 and rapidly increases the temperature of the Diesel oil which rises above 50° C. and in turn causes the opening of the thermostat valve 11 in the return pipe 14 leading to the main tank 13.

There is then observed a rise in the temperature of the whole of the Diesel oil contained in the tank 13 until a value in the neighbourhood of the temperature of the cooling liquid of the engine is reached which is of the order of 80° C. under continuous operating conditions.

The exchanger employed in the apparatus just described and shown in section in FIG. 2 comprises a body 30 of aluminium or other suitable material in which are defined two coaxial tubular circuits respectively for the Diesel oil and the cooling liquid of the engine. The body 30 is closed at each end by two end walls 31 and 32. The wall 31 includes an aperture 33 to which the Diesel oil supply pipe 15 is connected. The path of the Diesel oil comprises, starting at the supply aperture 33, a tubular pipe 34 connected to an outlet aperture 35 formed in the end wall 32.

The path of the cooling liquid of the engine comprises, starting at the supply pipe 17, a thermostat valve 19 and a cylindrical pipe 36 disposed concentrically within the pipe 34, an aperture 37 to which there is connected the cooling fluid return pipe 18 leading to the engine. In this exchanger, the two fluids between which the heat exchange occurs flow in a counter-current manner.

It must be understood that this exchanger has been described merely by way of example and may be replaced by any exchanger of suitable type.

Having now described my invention what I claim as new and desire to secure by Letters Patent is:

1. An apparatus for heating fuel injected into Diesel engine fuel tank, said apparatus comprising a heat exchanger, heat-carrying fluid supply means, pipe means connecting the heat-carrying fluid supply means to the heat exchanger, means for connecting the heat exchanger to the fuel tank, a vessel for containing a reserve supply of hot fuel and containing at least one auxiliary source of heat, an injection pump having an inlet and an outlet, a thermostat valve comprising three ways, first pipe means connecting a first of said ways to the outlet of the injection pump, second pipe means connecting a second of said ways to the vessel and third pipe means connecting a third of said ways to the fuel tank, pipe means connecting the inlet of the injection pump to the vessel, the thermostat valve being arranged to connect the outlet of the injection pump to the vessel below a previously-fixed temperature of the fuel in the vessel.

2. An apparatus as claimed in claim 1, wherein the thermostat connects said outlet of the injection pump to the fuel tank beyond a temperature adjusted to between about 30° C. and 60° C.

3. An apparatus as claimed in claim 2, wherein the thermostat valve is a wax thermostat valve.

4. An apparatus as claimed in claim 1, 2 or 3, wherein the heat-carrying fluid is a cooling liquid for said engine, said pipe means connecting said supply means to the exchanger including a thermostat valve which is arranged to supply said heat-carrying fluid to the heat exchanger when the temperature of the cooling liquid reaches a predetermined value adjusted to between about 35° C. and 60° C.

5. An apparatus according to claim 1, 2 or 3, wherein the heat-carrying fluid is constituted by the exhaust gases of the engine.

6. An apparatus according to claim 1, 2 or 3, wherein the heat-carrying fluid is constituted by the lubricating oil of the engine.

7. An apparatus as claimed in claim 1, 2 or 3, wherein the auxiliary source of heat placed in said vessel is an electric resistor for connection to a battery of the engine.

8. An apparatus as claimed in claim 1, 2 or 3, wherein said vessel further comprises a second auxiliary source of heat constituted by an electric resistor for connection to a source of electricity exterior to the engine.

* * * * *